United States Patent Office 2,825,696
Patented Mar. 4, 1958

2,825,696

FINGERNAIL POLISH REMOVER

Walter Zabban, Allegheny County, Pa., and Raymond W. Southworth, New Haven County, Conn., assignors to Artemas F. Holden, Detroit, Mich.

No Drawing. Application June 12, 1953
Serial No. 361,441

5 Claims. (Cl. 252—119)

This invention relates to an improved composition for removing nitrocellulose lacquer polish from fingernails.

The portion of fingernail polish removers active in removing the polish is made up primarily of one or more solvents for the lacquer serving as a vehicle for the pigment in the polish, and also may include other modifying agents such as perfume and either oil or water, or both, for softening the nail and cuticle and preventing dehydration by the lacquer solvent.

Nail polish may be removed from the nails by the use of such a remover by placing a small quantity of the remover on the nail, allowing the lacquer of the polish to become softened, and then wiping the polish from the nail; or, alternatively, a nail polish remover applicator such as a sponge or brush positioned in the neck of a remover-containing bottle such as shown in Patent 2,629,124 to Merritt may be moistened with the remover, the nails then being successively scrubbed against the moistened applicator to wash away the polish.

Difficulty is experienced with the ordinary nail polish remover in that it leaves the active pigment, and dye, if any, of the removed polish and the dissolved lacquer thereof in the solvent of the remover. The pigment and dye tend to redeposit on the nail, cuticle, and flesh of the hand, being bonded thereto by deposition of the dilute redissolved vehicle of the polish, and are difficult to remove. The redeposition of the nail polish is particularly bothersome when the second of the above-discussed methods of polish removal is used, since, upon use, the concentration of removed pigment builds up in the relatively small amount of polish remover in the container, and thus the color of the removed pigment in the remover grows progressively more intense.

The fingernail polish remover of the present invention overcomes such difficulties by incorporating in the polish remover a sequestering agent for decolorizing the removed pigment and dye. The sequestering agent is a small part of the active portion of the polish remover, the active portion thereof including one or more lacquer solvents and the sequestering agent. The pigments of nail polishes are usually salts of heavy metals, the usual red pigments being formed of salts of ferric (trivalent) iron. The dyes generally used in nail polishes are organic dyes. The sequestering agent employed in the remover of the present invention has a complexing action so as to form with the pigment stable complex compounds the formation of which is attended by decolorization of the pigment. In some manner not known to applicants, the dyes, if any, contained in the nail polish are also largely decolorized by action of the sequestering agent. The sequestering agent preferably employed is ethylenedinitrilo tetraacetic acid and/or its sodium salts, particularly the tetrasodium salt. The sequestering agent is preferably added in the form of a concentrated aqueous solution and has the ability to form soluble non-ionic chelates with polyvalent metallic ions.

The nail polish remover may be in liquid form, in which case it may be formed predominantly of nitrocellulose lacquer solvent with a small but effective amount of sequestering agent. The remover, however, is preferably in either paste or cream form, the body of the paste or cream usually being formed from an emulsified or saponified fatty acid. Pastes or creams are preferred in some instances because of the lower rate of evaporation of the lacquer solvent therefrom. Emollients such as oils or waxes may also be added to the remover, in varying desired amounts, to prevent the dehydration of the cuticle and nail. The presence of emulsified or saponified fatty acids and emollients do not detrimentally effect the chelating or complexing action of the sequestering agent.

It is accordingly among the objects of the invention to provide an improved fingernail polish remover characterized by the completeness of removal of the polish from the fingernail and the prevention of redeposition on the finger or nail.

A further object of the invention resides in the provision of a fingernail polish remover which decolorizes the pigment and dye in the removed polish so as to prevent unwanted staining of the cuticle, the nail, or the flesh of the hand.

Yet another object of the invention lies in the provision of a fingernail polish remover composition wherein buildup of active colored pigment and dye in a dilute solution of the removed polish in the remover is prevented.

The above and other objects of the invention will be more readily apparent upon consideration of the following description of preferred illustrative embodiments of the fingernail polish remover of the present invention. It is to be understood that these examples are illustrative only and that the invention is not to be restricted thereto, the scope of the invention being indicated in the appended claims. The following are specific examples of fingernail polish removers within the scope of the invention, the components being given in percent by weight of the total composition:

*Example 1.—Liquid form of fingernail polish remover*

Percent

Solvent:
- Ethyl acetate _____ 39.9 ⎫
- n-Butyl acetate _____ 19.5 ⎬ 77.2
- Methyl ethyl ketone _____ 10.8 ⎪
- Ethyl alcohol (ethanol) _____ 7.0 ⎭

Dehydrated castor oil _____ 1.4

Tetrasodium ethylenedinitrilo tetraacetate_ 10.35 ⎫ 21.4
Water _____ 11.05 ⎭

100.0

Example 1 indicates a liquid nail polish remover, including a solvent for nitrocellulose lacquer, an emollient, and a sequestering agent.

*Example 2.—Paste form*

Percent

Solvent:
- Ethyl acetate _____ 26.3 ⎫
- Methyl ethyl ketone _____ 11.4 ⎬ 51.5
- n-Butyl acetate _____ 8.5 ⎪
- Ethyl alcohol _____ 5.3 ⎭

Paraffin _____ 5.3
Beeswax _____ 6.3
Stearic acid _____ 19.3
Triethanolamine _____ 5.8
Tetrasodium ethylenedinitrilo tetraacetate__ 5.7 ⎫ 11.8
Water _____ 6.1 ⎭

100.0

Example 2 indicates the use of a mixture of a few of the many nitrocellulose lacquer solvents which may be used, either singly or in combination, in the fingernail polish remover of the present invention.

*Example 3.—Cream form*

Solvent:

| | Percent | |
|---|---|---|
| Methyl ethyl ketone | 36.8 | |
| Ethyl acetate | 41.5 | 78.3 |
| Stearic acid | 9.6 | |
| Potassium hydroxide | 1.9 | |
| Bentonite | 0.5 | |
| Tetrasodium ethylenedinitrilo tetraacetate | 4.9 | |
| Water | 4.8 | 9.7 |
| | 100.0 | |

*Example 4.—Cream form*

Solvent:

| | Percent | |
|---|---|---|
| Ethylene glycol monoethyl ether | 41.4 | |
| Ethyl acetate | 13.6 | 55.0 |
| Paraffin | 5.0 | |
| Beeswax | 5.9 | |
| Stearic acid | 18.0 | |
| Triethanolamine | 5.4 | |
| Tetrasodium ethylenedinitrilo tetraacetate | 6.0 | |
| Water | 4.7 | 10.7 |
| | 100.0 | |

*Example 5.—Cream form*

Solvent:

| | Percent | |
|---|---|---|
| n-Butyl acetate | 25.0 | |
| Methyl ethyl ketone | 44.7 | 69.7 |
| Stearic acid | 15.3 | |
| Lanolin | 3.8 | |
| Potassium hydroxide | 2.0 | |
| Tetrasodium ethylenedinitrilo tetraacetate | 5.1 | |
| Water | 4.1 | 9.2 |
| | 100.0 | |

It has been found that the active portion (solvent and sequestering agent) of the fingernail polish remover should contain from 84% to 95% of solvent for cellulose nitrate and from 16% to 5% by weight of material selected from the group of chemicals consisting of ethylenedinitrilo tetraacetic acid and its sodium salts, preferably the tetrasodium salt. This salt is preferably in the form of a relatively concentrated aqueous solution, although dispersions and solutions other than aqueous will operate. In the preferred form of nail polish remover the active portion consists of approximately 92% by weight of solvent for cellulose nitrate and approximately 8% by weight of tetrasodium ethylenedinitrilo tetraacetic acid in aqueous solution.

In the liquid form of fingernail polish remover, the lower limit of sequestering agent is determined by the least amount that will function effectively, and the upper limit is determined by the amount that can be used effectively without unduly diluting the solvent and obtaining unwanted physical characteristics in the liquid.

In the cream and paste forms of the invention, the lower limit is likewise determined by the least amount that will function effectively, and the upper limit is determined by the nature and the viscosity of the resultant cream or paste, additional sequestering agent forming a gel with the stearic or other fatty acid present. This stiffening action in the paste and cream type removers is apparently due to the reaction of the sequestering agent (tetrasodium ethylenedinitrilo tetraacetate) with a fatty acid (stearic acid in the above examples). The creamy or pasty consistency of such remover decreases the tendency of the product to dry out due to evaporation of the solvent.

It has been found that the most satisfactory cream remover, from the standpoint of texture, is secured when the ratio of tetrasodium ethylenedinitrilo tetraacetate to the weight of fatty acid lies between 0.2 and 0.6.

In all of the above examples, other known solvents for cellulose nitrate lacquers may be substituted and the relative proportions of the solvents may be changed as desired. Likewise, the emollient (lanolin, paraffin, or beeswax in the above examples) may be changed by substituting other known emollients, the amount of emollient added being only sufficient to counteract the drying effect of the solvent on the nail or cuticle. The bentonite incorporated in Example 3 above is merely an inert filler to promote the desired consistency of the product.

Potassium hydroxide may be added in small amounts as indicated in Examples 3 and 5 above to obtain a pH value within the range of 6–8.5, the most desirable range being 8–8.5 for best results consistent with no damaging or unpleasant effect on the hands, the tetrasodium ethylenedinitrilo tetraacetate operating better in alkaline media. The water indicated in all of the above examples is the water accompanying the tetrasodium ethylenedinitrilo tetraacetate sequestering agent used as a dispersion in the remover.

We claim:

1. A composition in the form of a cream for dissolving and removing hardened fingernail polish: the active ingredients of which are from 84 to 95% solvent for cellulose nitrate and from 16 to 5% of tetrasodium salt of ethylene-dinitrilo tetraacetic acid; and the other ingredients of which are stearic acid in a ratio of from .8 to 5 parts by weight of acid to 1 part by weight of the tetrasodium salt of ethylene-dinitrilo tetraacetic acid, water in an amount substantially equal in weight to the weight of the tetrasodium salt of ethylene-dinitrilo tetraacetic acid and an amount of an alkaline saponification reagent in an amount sufficient to adjust the pH of the cream to within the range of from 6 to 8.5.

2. The composition of claim 1 wherein the active ingredients are 92% solvent and 8% tetrasodium salt of ethylene-dinitrilo tetraacetic acid.

3. A composition in the form of a cream for dissolving and removing hardened fingernail polish, made from the following ingredients by weight:

| | Percent |
|---|---|
| Methyl ethyl ketone | 36.8 |
| Ethyl acetate | 41.5 |
| Stearic acid | 9.6 |
| Potassium hydroxide | 1.9 |
| Bentonite | 0.5 |
| Tetrasodium salt of ethylene-dinitrilo tetraacetic acid | 4.9 |
| Water | 4.8 |
| | 100.0 |

4. A composition in the form of a cream for dissolving and removing hardened fingernail polish, made from the following ingredients by weight:

| | Percent |
|---|---|
| Ethylene glycol monoethyl ether | 41.4 |
| Ethyl acetate | 13.6 |
| Paraffin | 5.0 |
| Beeswax | 5.9 |
| Stearic acid | 18.0 |
| Triethanolamine | 5.4 |
| Tetrasodium salt of ethylene-dinitrilo tetraacetic acid | 6.0 |
| Water | 4.7 |
| | 100.0 |

5. A composition in the form of a cream for dissolving and removing hardened fingernail polish, made from the following ingredients by weight:

| | Percent |
|---|---|
| n-Butyl acetate | 25.0 |
| Methyl ethyl ketone | 44.7 |
| Stearic acid | 15.3 |
| Lanolin | 3.8 |
| Potassium hydroxide | 2.0 |
| Tetrasodium salt of ethylene-dinitrilo tetraacetic acid | 5.1 |
| Water | 4.1 |
| | 100.0 |

References Cited in the file of this patent

UNITED STATES PATENTS

| 2,268,642 | Carter | Jan. 6, 1942 |
| 2,564,129 | Rotelli | Aug. 14, 1951 |
| 2,709,178 | Schlapfer et al. | May 24, 1955 |

OTHER REFERENCES

Sequestrene, by Alrose Chem. Co.; pp. 1–3, 14, 15, 20–22 and 30, pub. by Alrose Chemical Co., Providence, R. I. (1952).

Chemical Formulary by Bennett, vol. 8, page 72 (1948), vol. 9, pages 90 and 91 (1951); Chemical Pub. Co., Inc., Brooklyn, N. Y.